United States Patent
Jhabvala et al.

(10) Patent No.: US 10,306,155 B2
(45) Date of Patent: May 28, 2019

(54) COMPACT, HIGH RESOLUTION THERMAL INFRARED IMAGER

(71) Applicant: The United States of America as represented by the Administrator of the National Aeronautics and Space Administration, Washington, DC (US)

(72) Inventors: Murzban D. Jhabvala, Clarksville, MD (US); Donald E. Jennings, College Park, MD (US); Compton J. Tucker, Washington, DC (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 200 days.

(21) Appl. No.: 15/194,835

(22) Filed: Jun. 28, 2016

(65) Prior Publication Data

US 2017/0374297 A1    Dec. 28, 2017

(51) Int. Cl.
| | |
|---|---|
| *H04N 5/33* | (2006.01) |
| *G02B 5/20* | (2006.01) |
| *G02B 17/08* | (2006.01) |
| *B64G 1/10* | (2006.01) |
| *B64G 1/66* | (2006.01) |
| *H04N 5/232* | (2006.01) |

(52) U.S. Cl.
CPC .............. *H04N 5/33* (2013.01); *B64G 1/1021* (2013.01); *B64G 1/66* (2013.01); *G02B 5/208* (2013.01); *G02B 17/0808* (2013.01); *H04N 5/23245* (2013.01)

(58) Field of Classification Search
CPC . H04N 5/2254; G02B 17/0808; B64G 1/1021
See application file for complete search history.

(56) References Cited

U.S. PATENT DOCUMENTS

| | | | | | |
|---|---|---|---|---|---|
| 4,950,896 | A | * | 8/1990 | Liebson | H04N 5/33 250/332 |
| 5,084,621 | A | * | 1/1992 | Geiser | G01J 1/04 250/352 |
| 5,144,138 | A | * | 9/1992 | Kinch | H01L 27/14601 250/332 |
| 5,227,923 | A | * | 7/1993 | Kebo | G02B 17/0636 359/366 |
| 5,870,063 | A | * | 2/1999 | Cherrette | B64G 1/1007 342/354 |
| 2004/0056966 | A1 | * | 3/2004 | Schechner | H04N 5/2254 348/229.1 |
| 2012/0002202 | A1 | * | 1/2012 | Chrisp | G01J 3/0208 356/328 |
| 2016/0065006 | A1 | * | 3/2016 | Woods | B64G 1/64 307/84 |
| 2017/0142351 | A1 | * | 5/2017 | Cole | G01J 5/0018 |
| 2017/0355081 | A1 | * | 12/2017 | Fisher | B25J 9/1697 |

* cited by examiner

*Primary Examiner* — Jonathan R Messmore
(74) *Attorney, Agent, or Firm* — Christopher O. Edwards; Bryan A. Geurts; Mark P. Dvorscak

(57) ABSTRACT

A dual band infrared imaging system self-contained to fit within a small spacecraft is provided. The imaging system uses a detector array cooled by a mini cryocooler, and includes telescope optics and two bandpass filters for fire detection and thermal and evapotranspiration Earth science.

18 Claims, 4 Drawing Sheets

100

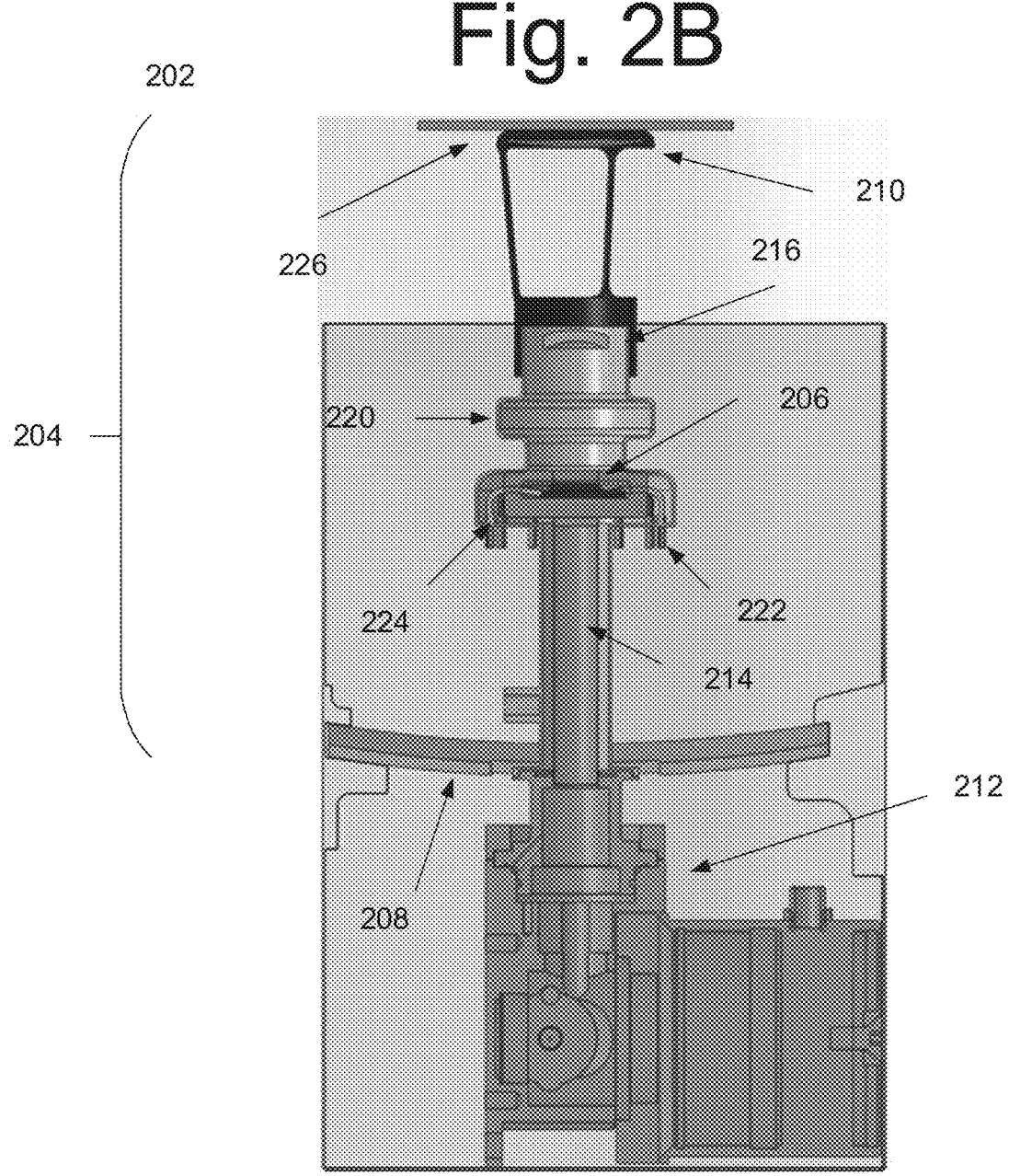

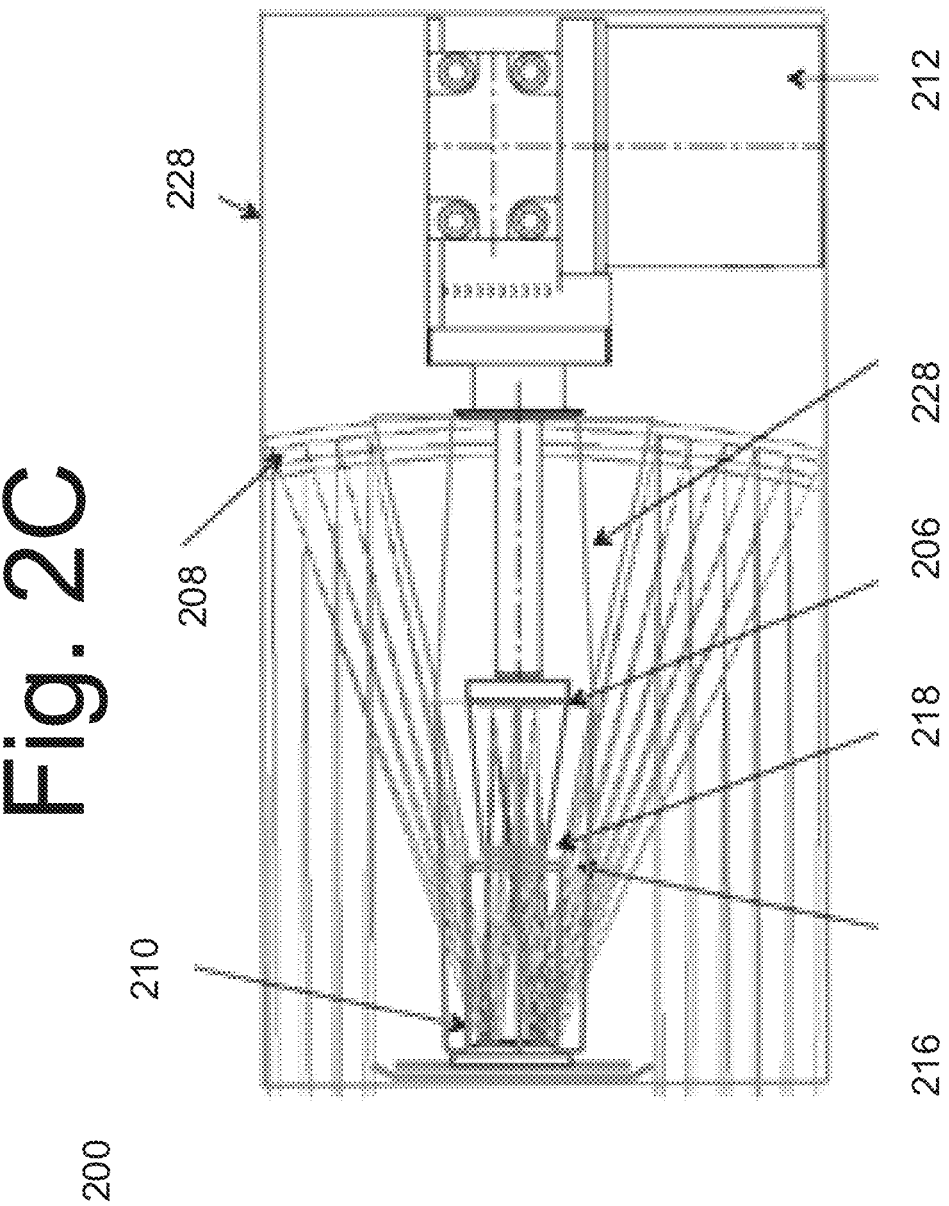

COMPACT, HIGH RESOLUTION THERMAL INFRARED IMAGER

STATEMENT OF FEDERAL RIGHTS

The invention described herein was made by employees of the United States Government and may be manufactured and used by or for the Government for Government purposes without the payment of any royalties thereon or therefore.

FIELD

The present invention generally relates to an imager, and more particularly, to a low cost, compact, dual-band infrared (IR) camera system that fits within a small spacecraft.

BACKGROUND

When land vegetation or biomass (i.e., biological mass) burns, aerosols and trace gases, such as CO, $CO_2$, and $CH_4$, are released to the atmosphere. These are important for atmospheric composition, and these trace gases are a fundamental part of the carbon cycle. The irradiance from biomass burning for flaming fires at approximately 1,000 K and smoldering fires at approximately 600 K, both peak in the atmospheric window from 3.5 to 4.0 µm. See, for example, graph 100 shown in FIG. 1. By comparing the radiance at 3.5-4.0 µm with the radiance at 10-12 µm, the temperature of the fire can be measured. Simply put, the temperature of the fire can be determined by taking the ratio of the intensity in the 3.5-4.0 µm channel to the intensity in the 10-12 µm channel. Thus, a shortwave infrared channel at the 3.5-4.0 µm wavelength, together with a thermal channel at 11 µm, are key to obtaining better data for determining (1) the area of the biomass-burning fire, especially for smaller fires, and (2) the temperatures of combustion.

These two fire variables determine the types and quantities of aerosols and also the quantity of CO, $CO_2$, and $CH_4$ released from fires. These two channels would benefit inventory-based methods for estimating fire emissions (i.e., those not considering combustion temperatures and radiative power) by affording the ability to distinguish between different fire types such as cropland fires, prescribed forest management fires, and deforestation fires.

However, the thermal channels on ASTER are not optimized for biomass burning, while the MODIS instruments have optimally placed thermal channels with spatial resolutions of 1000 m.

Thus, an alternative approach may be beneficial.

SUMMARY

Certain embodiments of the present invention may provide solutions to the problems and needs in the art that have not yet been fully identified, appreciated, or solved by imaging devices. For example, some embodiments generally pertain to a low cost, compact, dual-band infrared IR camera system (the "IR camera system"). The IR camera system may fit within a 3U CubeSat, may be installed on the International Space Station, may be deployed on a spacecraft, or may be operated from an aircraft. This IR camera system may provide more detailed spatial and temporal data for biomass burning, agricultural evapotranspiration research, and land and ice surface temperatures at, for example, a 60 m spatial resolution from a 500 km orbit with a system noise equivalent delta temperate (NEAT) less than 0.2° C.

In an embodiment, an apparatus may include an infrared IR imaging assembly installed within a frame of a 3U CubeSat configured to provide spatial data and temporal data using a band ranging from 1 µm to 14 µm. The IR imaging assembly encompasses top half of the frame and a bottom half of the frame is reserved for a power supply, data handling and an electronic package for pointing.

In another embodiment, an IR imaging system may include an IR imaging assembly that utilizes a detector array to provide spatial data and temporal data via IR spectral bands. The IR imaging assembly may be installed within a top half of an exoskeletal frame of a 3U CubeSat.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIGS. 2A-2C are cross-sectional views illustrating an IR imaging system, according to an embodiment of the present invention.

DETAILED DESCRIPTION OF THE EMBODIMENTS

Embodiments of the present invention generally pertain to a dual band IR imaging system (the "imaging system"). For purposes of explanation, the imaging system may be self-contained, and may fit within the top two-thirds of a 3U CubeSat envelope in certain embodiments. However, in other embodiments, the imaging system may be installed on the International Space Station or may be deployed on another orbiting or airborne platform.

Figure 1:
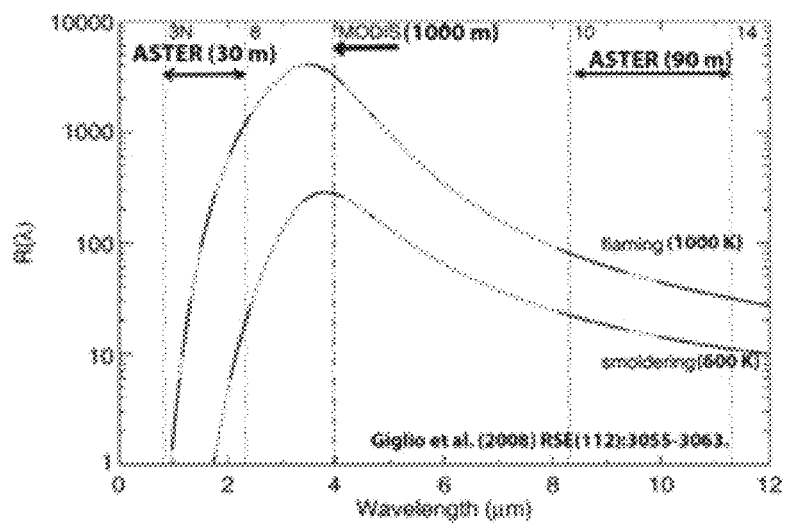
FIG. 1 is a graph illustrating a ratio of fire spectral radiances to a daytime background Earth spectral radiance of 300 K for flaming fires at 1,000 K and smoldering fires at 600K.
Figure 2A:
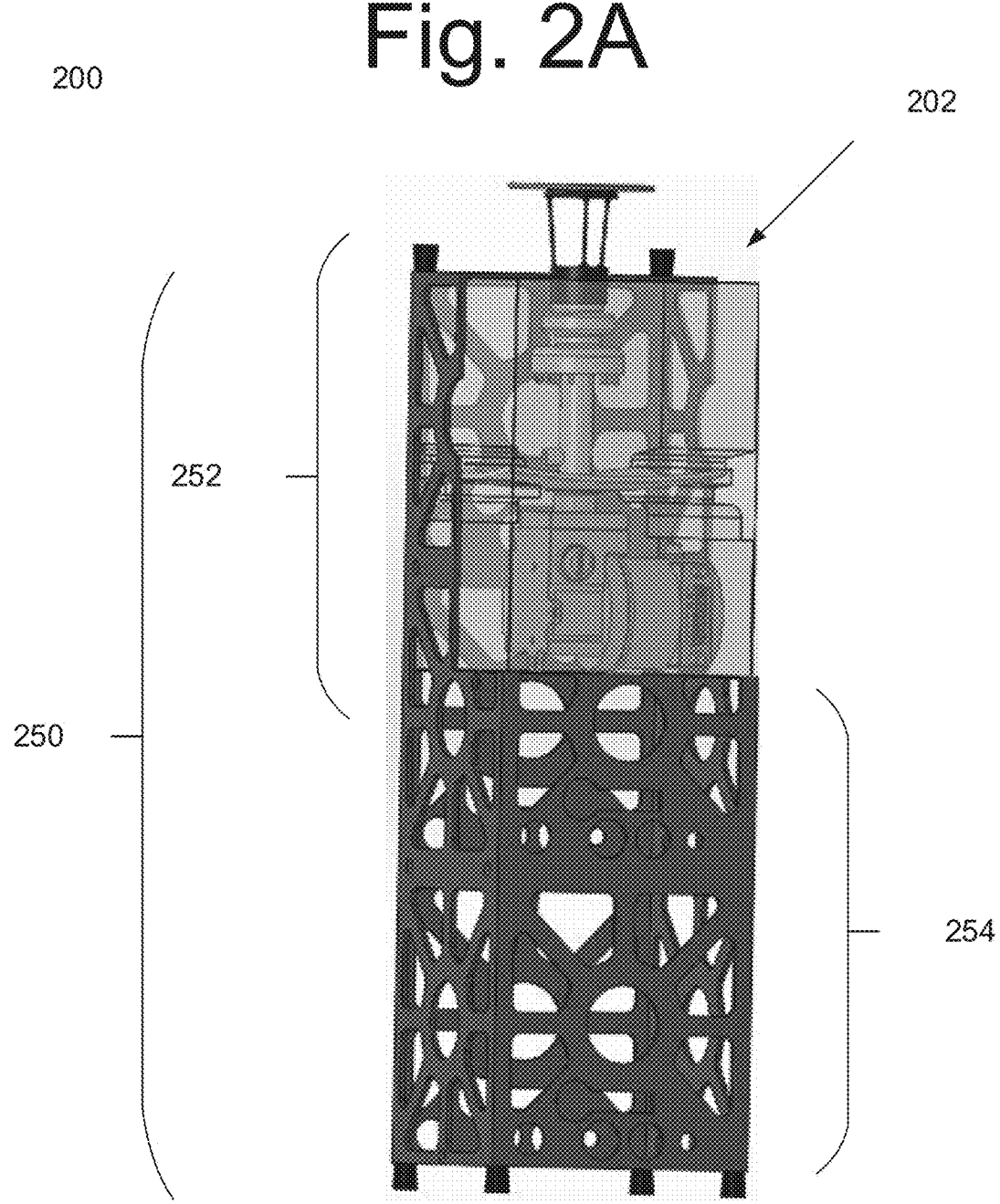

FIGS. 2A-2C are cross-sectional views illustrating an IR imaging system 200, according to an embodiment of the present invention. In FIG. 2A, IR imaging assembly 202 in some embodiments is self-contained to fit within top portion 252 of an exoskeletal frame 250 of 3U CubeSat envelope. For example, IR imaging assembly 202 may be inserted within top two-thirds portion 252 of exoskeletal frame 250. The bottom portion, or bottom one-third portion, 254 of exoskeletal frame 250 may be vacant and reserved for a power supply, electronics for data handling, and other electronics for pointing.

Referring to FIG. 2B, IR imaging assembly 202 may utilize a strained-layer super lattice (SLS) GaSb/InAs broadband detector array (the "detector array") 204 having an array format of 640×512 in some embodiments. In other embodiments, the array format may be 1 k×1 k, 4 k×4 k, or any array format that would be appreciated by a person of ordinary skill in the art. Detector array 204 in some embodiments may respond to normal incidence light, and also have quantum efficiency, or sensitivity, that is greater than 30 times that of a quantum well infrared photodetector.

IR imaging assembly 202 may also include telescope optics and have two IR bandpass filters centered at 4 µm (for fire detection) and 11.0 µm (for thermal and evapotranspiration Earth science). In some embodiments, IR imaging assembly may include hyperspectral filters, or any other type of filter that would be appreciated by a person of ordinary skill in the art. It should be appreciated that a 3.5 to 4.0 µm wavelength is key to obtaining better data for biomass burning and determining the radiative power of fires and the temperatures of combustion. These two fire variables that in turn determine the types and quantities of aerosols released and also the quantity of CO, $CO_2$, and $CH_4$ released from fires. This channel may also benefit inventory-based methods for estimating fire emissions (i.e., those not considering combustion temperatures and radiative power) by affording the ability to distinguish between different fire types such as cropland fires, prescribed forest management fires, and deforestation fires.

To define the fire sensing spectral band (approximately 3.5 to 4.5 µm) and the land-surface temperature band (approximately 10.5 to 11.5 µm), two bandpass filters are placed above detector array 204. For example, 1.0 µm bandwidth bandpass filters are placed approximately 200 µm above detector array 204 in some embodiments. By way of example, each bandpass filter covers one-half of detector array 204 converting the single 640×512 array into two sections, each 640×256. This will provide a 38 km swath width (from a 500 km CubeSat orbit) in certain embodiments.

IR imaging assembly 202 may also include an IR camera, which includes a first mirror 208, second mirror 210, and a sensor chip assembly (SCA). The SCA may include the SLS detector hybridized to a silicon readout integrated circuit (IC) in some embodiments. In certain embodiments, the SCA is mounted to a metalized, patterned substrate and wire bonded to pads leading to the edge of the metalized, patterned substrate.

The IR imaging assembly 202 may place a focal plane 206 between primary mirror 208 and secondary mirror 210. This saves payload length by letting the cold tip of cryocooler 212 protrude into the telescope volume. In some embodiments, IR imaging assembly 202 may have a 21 cm focal length with a 4.4 degree cross-track field of view (FOV).

A look at FIG. 2C shows an optical ray trace of a front-end IR assembly in an imaging system 200, according to an embodiment of the present invention. Simply put, FIG. 2C demonstrates that the rays fall within a width of the detector. In these embodiments, primary mirror 208 may fit within an available 10 cm×10 cm CubeSat cross-section and maximize light collection and resolution. The optical axis of primary mirror 208 may be offset slightly from the CubeSat centerline, allowing cryocooler 212 to fit within payload 230. In some embodiments, vacuum housing 228 may provide thermal ambient isolation necessary for cryogenic operation of the detector array.

Primary mirror 208 may collect light from the end aperture (or distal end) of the CubeSat. In some embodiments, primary mirror 208 may have a cut-out in its center and may be placed over a cold finger stem 214 of cryocooler 212. In certain embodiments, cold finger stem 214 may be the thermal link between the engine of cryocooler 212 and the interface of detector array 204. Also, in some embodiments, detector array 204 may be attached to the tip of cold finger stem 214. The SCA subassembly is epoxied to a cold tip of cryocooler 212 in some embodiments.

Background blocker 226 in some embodiments is a temperature-controlled circular disk located behind the secondary image, and may obscure light coming from the scene that would otherwise reach the focal plane without following the optical path through the telescope. Background blocker 226 may minimize background intensity in variations in the detected signal.

After the light is focused by secondary mirror 210, the light passes through a warm vacuum window (or IR window) 216 and then through a cold blocking filter 218 to minimize the background flux. Cold blocking filter 218 may form the aperture of a cold vacuum enclosure 220 (see FIG. 2B) inside the vacuum shroud, and may be combined with a field-flattening lens that optimizes imaging at detector array 204.

As discussed above, two bandpass filters, each covering one-half of the detector array 204, are mounted approximately 200 µm above the array surface in a filter holder mounted directly to focal plane 206. The bandpass filters are cooled by being in thermal contact with the focal plane. Cooling of the filters is necessary to minimize thermal loading from out-of-band wavelengths. This configuration allows cryocooler 204, camera head and telescope to be a very compact and integrated unit.

In some embodiments, detector array 204 may be cooled to approximately 67 K by a cryocooler 212. Cryocooler 212, which may be a mechanical cryocooler, may range in operating temperature from 150 K to 30 K depending on the operating conditions and detector requirements. By using cryocooler 212, the need for liquid cryogens is eliminated. Additionally, cryocooler 212 is extremely lightweight, compact, has low operating power requirements and is relatively inexpensive.

In some embodiments, a frame (not shown) containing two bandpass filters is positioned and secured approximately 200 µm above the detector surface. A metal vacuum shroud containing electrical feedthrough pins 222 may be welded to the base of cryocooler 212. The metalized, patterned substrate may be wire bonded 224 to feedthrough pins 222 that penetrate the shroud. A shroud cover, which includes an IR window, may be welded to the shroud body. Once assembled, the entire shroud volume may be evacuated, and the body tube is sealed by pinching it closed. Although not shown, a wiring harness may connect a camera electronics control box through a cut-out from primary mirror 208, to soldered feedthrough pins 220 on the shroud of cryocooler 212. In some embodiments, the entire imager payload may be mounted in an aluminum box, which mounts directly into the frame of the CubeSat.

The imager electronic system (IES) may operate the imager and collect and display data. By controlling the integration time, gain, and detector bias voltage, targets ranging in temperature from 200 K to 1200 K (snow/ice and fires) may be captured.

Although not shown in detail, in some embodiments, the output "dual purpose harness" is connected to the multipurpose connector. The harness may be connected to a commercially 110 VAC power adapter in some embodiments. The power adapter may provide 16 VDC. The harness may also be connected to a laptop computer to display real-time imagery. The 16 VDC may power cryocooler 212 and also be converted to regulated 3.3 and 5.5 VDC supplies for the analog and digital control lines.

A field programmable gate array (FPGA) may generate the timing sequence for running IC. The IC may include four parallel analog outputs and these signals may then be digitized with four 14-bit analog-to-digital converters. The analog data may be amplified (by the 4 pre-amps) and converted to 14-bits at 20 million words/channel-second. In some embodiments, the array may include 327,680 pixels so at this rate up to 61 frames per second can be acquired. This electronics system may be directly interfaced with a user interface laptop computer, which may control the camera parameters, such as the integration time and detector bias, and may also provide the science data output as .tiff or FITS files for easy data management and analysis. This electronics system may support ground and aircraft testing and verification Push-Broom Mosaic Imaging Imaging may be performed in a push-broom mode, with snapshots taken at intervals that permit full mosaic reconstruction of the scene. In a thermal imaging mode, the frame integration time is 1 ms, short enough to prevent smearing the 60-m ground resolution. In a fire characterization mode, much shorter integration times are used, together with decreased bias tailored to avoid saturation. As discussed above, the detector array is divided into two equal pixel areas, each half imaging through a bandpass filter. The scene may be scanned in the push-broom mode with the 640-dimension in the cross-track direction. In both observing modes, an image is taken once per second so that a snapshot is recorded twice per image width on the ground. A 15 km×38 km scene may be imaged in both bands every two seconds. Spacecraft roll may be used to achieve cross-track pointing to reach target scenes that are off the nadir line.

Sensitivity

In some embodiments, in the thermal imaging mode, a signal-to-noise (S/N) may be in the 11 µm channel of over 1000 on a 250 K target with an integration time of 1 ms. The target signal may be determined by integration time, target radiance, telescope throughput, transmission of the lens and filter, and quantum efficiency of the detector array. The noise may be dominated by the dark current and the background. The dark current may be measured using a few rows of blackened pixels on the array. Background radiation may be minimized by the cold bandpass filters, but fluctuations in the background may limit the S/N. Fluctuations may be controlled by a uniform panel that fills the field of view of the cold stop. The temperature of the background panel (to 0.1 K) is measured to determine the background level and digitally subtract it from the total signal. In the fire characterization mode, the gain and integration time may be adjusted to keep from saturating the detectors on bright (1000 K) fires. The S/N on burning sites will exceed several hundred.

Some embodiments of the present invention pertain to a small and highly accurate thermal imaging system that provides detailed information about thermal changes currently occurring within the Earth system. The thermal imaging system provides temperature and flux retrievals required for evaluating climate models used to predict future changes. In some embodiments, thermal imaging system may be designed for satellite, aircraft, and ground measurements, and may address two key Earth science climate questions and one key applied science objective. The thermal imaging system may also provide (1) greatly improved carbon and aerosol fluxes from biomass burning by accurately mapping all fire sizes and their respective combustion temperatures; (2) spatially-detailed surface temperature maps of ice that will enable geophysical understanding of ice sheet surface melt processes for the first time; and (3) improved thermal data needed to maximize agricultural water use efficiency, thus conserving water resources on an increasingly parched planet where agricultural production must be maximized to feed and clothe expanding populations.

The thermal imaging system may have a broad IR spectral coverage ranging from 3 µm to 13 µm, and have a large array format that is upward scalable. The thermal imaging system may be compact, small and light weight, with low power requirements (e.g., approximately 12 W). The thermal imaging system may be configured to a single-band, multi-band, or hyperspectral in some embodiments.

The thermal imaging system may be applied to a variety of space missions for Earth and space science. For example, the thermal imaging system may measure a size of a fire and combustion temperatures for fires from approximately 60 m from space. Thermal imaging system may provide an increase geophysical understanding of the ice sheet melt dynamics and may process the same from approximately 60 m from space. In another example, the thermal imaging system may measure spatial and temporal water consumption of irrigated agriculture from approximately 60 m from space.

The thermal imaging system may have high resolution for airborne science, e.g., approximately 12 cm×12 cm/pixel at 1 km altitude. For example, the thermal imaging system may aid forest fire control efforts from aircraft at approximately less than 0.5 m spatial scale. The thermal imaging system may also measure component temperatures of shadow, crop canopy, and soil elements individually. The thermal imaging system may generate images of evapotranspiration and other energy balance fluxes at less than 0.5 m over flux tower sites and experimental fields. The thermal imaging system may also improve irrigated agricultural water use efficiency.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus for determining temperature and size of a fire by measuring observable characteristics of a fire from a satellite, the apparatus including a sensor, comprising:
   an infrared (IR) imaging assembly installed within a frame of a 3U CubeSat configured to provide spatial data and temporal data using a band ranging from 1 μm to 14 μm, wherein
   the IR imaging assembly encompasses top half of the frame and a bottom half of the frame is reserved for a power supply, data handling and an electronic package for pointing,
   means for determining temperature and size of a fire by measuring fire variables from a biological mass that releases aerosols and trace gases into the atmosphere;
   further including means for evaluating a ratio of measurements of flaming and smoldering fires; and
   means for comparing a ratio of measured fire variables to determine the type and size of a fire; wherein the band comprises a first band and a second band,
   wherein the first band comprises a wavelength ranging from 3.5 μm to 4.5 μm for fire detection and the second band comprises a wavelength ranging from 10.5 μm to 11.5 μm for thermal smoldering fires;
   wherein the IR imaging assembly further comprises a first bandpass filter and a second bandpass filter configured to convert a single array comprising a predefined pixel format into a first section and a second section, to define the first band and second band.

2. The apparatus of claim 1 wherein the first bandpass filter and the second bandpass filter comprise a predetermined bandwidth and are placed at a predefined distance above the detector array.

3. The apparatus of claim 1, wherein the first bandpass filter and the second bandpass filter are in thermal contact with a focal plane, cooling the first bandpass filter and the bandpass second filter.

4. The apparatus of claim 1, wherein the IR imaging assembly comprises
   a focal plane placed between a first mirror and a second mirror to save a length of a payload.

5. The apparatus of claim 1, wherein the IR imaging assembly comprises
   a first mirror configured to collect light from a distal end of a CubeSat;
   a second mirror configured to focus the light, wherein the focused light passes through a vacuum window and a cold blocking filter to minimize background flux.

6. The apparatus of claim 5, wherein the first mirror is offset from a centerline of the CubeSat, allowing a cryocooler to fit within a payload.

7. The apparatus of claim 5, wherein the first mirror comprises a cut-out in a center of the first mirror, allowing the first mirror to be placed over a cold finger stem of a cryocooler.

8. The apparatus of claim 7, wherein the cold finger stem provides a thermal link between an engine of the cryocooler and an interface of a detector array.

9. The apparatus of claim 6, wherein the cryocooler comprises an operating temperature ranging from 150 K to 30 K depending on operating conditions and a detector array.

10. The apparatus of claim 6, wherein the cryocooler is configured to cool detector array.

11. An infrared (IR) imaging system for determining temperature and size of a fire by measuring observable characteristics of said fire from a satellite, comprising:
    an IR imaging assembly utilizing a detector array to provide spatial data and temporal data via IR spectral bands, wherein
    the IR imaging assembly is installed within a top half of an exoskeletal frame of a 3U CubeSat;
    means for determining temperature and size of a fire by measuring fire variables from a biological mass that releases aerosols and trace gases into the atmosphere;
    further including means for evaluating a ratio of measurements of flaming and smoldering fires; and
    means for comparing a ratio of measured fire variables to determine the type and size of a fire; wherein the band comprises a first band and a second band,
    wherein the first band comprises a wavelength ranging from 3.5 μm to 4.5 μm for fire detection and the second band comprises a wavelength ranging from 10.5 μm to 11.5 μm for thermal smoldering fires;
    wherein the IR imaging assembly further comprises a first bandpass filter and a second bandpass filter configured to convert a single array comprising a predefined pixel format into a first section and a second section, to define the first band and second band.

12. The apparatus of claim 11, wherein the detector array comprises an array format of at least 128×128.

13. The apparatus of claim 11, further comprising:
    a first bandpass filter and a second bandpass filter, each covering one-half of the detector array, configured to convert a single array into an array with two section.

14. The apparatus of claim 13, wherein the first bandpass filter is placed above the detector array to define the spectral band and wherein the second bandpass filter is placed above the detector array to define the temperature band.

15. The apparatus of claim 11, further comprising:
    an IR camera comprising
    a first mirror,
    a second mirror, and
    a sensor chip assembly (SCA).

16. The apparatus of claim 15, wherein the first mirror is offset from a centerline of the CubeSat, configured to collect light from an end aperture of the CubeSat.

17. The apparatus of claim 15, wherein the second mirror is configured to focus light collected by the first mirror, and pass the light through a cold blocking filter to minimize background flux.

18. The apparatus of claim 15, further comprising:
    a focal plane placed between the first mirror and the second mirror to reduce a length of a payload.

* * * * *